United States Patent
Liao

(10) Patent No.: US 11,552,915 B2
(45) Date of Patent: Jan. 10, 2023

(54) MESSAGE SENDING METHOD, DEVICE, AND SYSTEM

(71) Applicant: HUAWEI TECHNOLOGIES CO., LTD., Guangdong (CN)

(72) Inventor: Tao Liao, Suzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 305 days.

(21) Appl. No.: 15/988,002

(22) Filed: May 24, 2018

(65) Prior Publication Data

US 2018/0270177 A1    Sep. 20, 2018

Related U.S. Application Data

(63) Continuation of application No. PCT/CN2015/095558, filed on Nov. 25, 2015.

(51) Int. Cl.
*H04L 51/214* (2022.01)
*H04L 51/04* (2022.01)
(Continued)

(52) U.S. Cl.
CPC .......... *H04L 51/214* (2022.05); *H04L 12/185* (2013.01); *H04L 51/04* (2013.01);
(Continued)

(58) Field of Classification Search
CPC ......... H04L 51/12; H04L 51/22; H04L 51/14; H04L 51/16; H04L 51/32; H04L 12/1813;
(Continued)

(56) References Cited

U.S. PATENT DOCUMENTS 6,400,810 B1 *  6/2002  Skladman ............... H04L 51/12
                                              379/93.24
7,159,011 B1 *  1/2007  Knight ................. G06Q 10/107
                                              709/207
(Continued)

FOREIGN PATENT DOCUMENTS

CN        1941718 A      4/2007
CN      100542173 C      9/2009
(Continued)

OTHER PUBLICATIONS

International Search Report issued in International Application No. PCT/CN2015/095558 dated Aug. 19, 2018, 17 pages.

(Continued)

*Primary Examiner* — Madhu Woolcock
(74) *Attorney, Agent, or Firm* — Fish & Richardson P.C.

(57) ABSTRACT

The present disclosure provides example message forwarding methods, devices, and systems. In one example method, a message server adds a first attribute tag for some group members in a group. Based on the first attribute tag, the message server creates a first subgroup consisting of the some group members. The message server receives a subgroup message including the first attribute tag, and the message server determines the first subgroup based on the first attribute tag. The message server then forwards the subgroup message to the determined first subgroup.

19 Claims, 16 Drawing Sheets

(51) Int. Cl.
*H04L 12/18* (2006.01)
*H04L 51/18* (2022.01)
*H04L 51/52* (2022.01)
*H04L 51/212* (2022.01)
*H04L 51/216* (2022.01)

(52) U.S. Cl.
CPC ............ *H04L 51/18* (2013.01); *H04L 51/212* (2022.05); *H04L 51/52* (2022.05); *H04L 51/216* (2022.05)

(58) Field of Classification Search
CPC ... H04L 12/185; H04L 65/403; H04L 67/306; G06Q 10/107; G06Q 10/10; G06F 16/9535
USPC ......... 709/206, 207; 715/752, 759, 761, 866
See application file for complete search history.

(56) References Cited

U.S. PATENT DOCUMENTS

| | | | | |
|---|---|---|---|---|
| 7,912,913 B2* | 3/2011 | Accapadi | ............... | H04L 43/00 709/219 |
| 8,234,335 B1* | 7/2012 | Haidar | ............... | H04L 65/4061 709/204 |
| 8,380,172 B1* | 2/2013 | Reeves | ............. | H04M 3/42042 455/412.1 |
| 8,706,685 B1* | 4/2014 | Smith | ................ | G06F 16/9558 707/608 |
| 8,838,708 B1* | 9/2014 | Rhodes | .................. | H04L 51/12 709/206 |
| 9,154,924 B2* | 10/2015 | Westman | ........... | H04L 12/1818 |
| 9,166,935 B1* | 10/2015 | Dodsworth | ........... | G06F 40/134 |
| 9,344,390 B1* | 5/2016 | Chandrasekar | ......... | G06F 16/38 |
| 9,395,865 B2* | 7/2016 | Chang | ................... | G06F 3/048 |
| 9,449,050 B1* | 9/2016 | Molina | ................ | G06F 16/24575 |
| 9,768,974 B1* | 9/2017 | Lewis | ................... | H04L 67/325 |
| 9,946,797 B2* | 4/2018 | Cardonha | ........... | G06F 16/9535 |
| 10,171,386 B1* | 1/2019 | Pendap | .................. | H04L 51/04 |
| 10,601,749 B1* | 3/2020 | Snow | ................... | H04L 51/32 |
| 2002/0147988 A1* | 10/2002 | Nakano | ............. | H04N 21/4786 725/134 |
| 2004/0111478 A1* | 6/2004 | Gross | ................ | H04L 51/22 709/206 |
| 2005/0114781 A1* | 5/2005 | Brownholtz | .......... | G06F 3/0482 715/713 |
| 2005/0234850 A1* | 10/2005 | Buchheit | .......... | H04L 51/16 |
| 2006/0020533 A1* | 1/2006 | Lee | ........................ | G06Q 10/10 705/35 |
| 2006/0067502 A1* | 3/2006 | Bamrah | ............. | H04M 7/0024 379/201.12 |
| 2006/0161849 A1* | 7/2006 | Miller | .................... | G06F 9/451 715/744 |
| 2007/0050488 A1* | 3/2007 | Joyner | ................ | G06Q 10/107 709/223 |
| 2008/0235334 A1* | 9/2008 | Gupta | .................. | G06Q 10/107 709/206 |
| 2009/0098859 A1* | 4/2009 | Kamdar | .................. | H04L 51/14 455/412.1 |
| 2009/0319912 A1* | 12/2009 | Serr | .................... | H04L 12/1827 715/753 |
| 2010/0005402 A1* | 1/2010 | George | .................. | H04L 51/04 715/758 |
| 2010/0205545 A1* | 8/2010 | Dawson | ................ | G06F 3/0482 715/758 |
| 2011/0184937 A1* | 7/2011 | Jin | ........................ | H04W 4/185 707/722 |
| 2011/0270880 A1* | 11/2011 | Jesse | ....................... | H04M 3/53 707/770 |
| 2012/0036197 A1* | 2/2012 | Bishop | ................. | G06Q 10/107 709/206 |
| 2012/0059886 A1* | 3/2012 | Shuster | ................... | H04L 51/28 709/206 |
| 2012/0284642 A1* | 11/2012 | Sitrick | ................. | G06F 40/197 715/753 |
| 2013/0055161 A1* | 2/2013 | Adams | .................. | G06F 16/904 715/811 |
| 2013/0066984 A1* | 3/2013 | Shin | .................... | H04L 12/1854 709/206 |
| 2013/0157609 A1* | 6/2013 | Vainik | ................. | G06F 11/0781 455/404.1 |
| 2013/0297604 A1* | 11/2013 | Sutedja | ................ | G06Q 10/107 707/737 |
| 2014/0304615 A1* | 10/2014 | Coe | ........................ | H04L 51/22 715/752 |
| 2015/0064671 A1* | 3/2015 | Murville | ........... | G06Q 30/0269 434/236 |
| 2015/0074547 A1* | 3/2015 | Banatwala | .......... | G06F 3/04842 715/752 |
| 2015/0163182 A1* | 6/2015 | Chandrasekaran | ........................... H04L 63/0227 709/204 |
| 2016/0140501 A1* | 5/2016 | Figlin | ................. | G06Q 10/103 705/7.15 |
| 2016/0182430 A1* | 6/2016 | Sachidanandam | ........................... G06F 3/04842 715/752 |
| 2016/0344678 A1* | 11/2016 | MacDonald | ........... | H04L 51/18 |
| 2016/0344679 A1* | 11/2016 | Lane | ................... | G06F 40/106 |
| 2017/0097827 A1* | 4/2017 | Furtado | .................. | G06F 9/445 |

FOREIGN PATENT DOCUMENTS

| | | |
|---|---|---|
| CN | 101542989 A | 9/2009 |
| CN | 101605109 A | 12/2009 |
| CN | 103188133 A | 7/2013 |
| CN | 103888344 A | 6/2014 |
| CN | 104125137 A | 10/2014 |
| CN | 104796326 A | 7/2015 |
| EP | 2922004 A1 | 9/2015 |
| WO | 2008065245 A1 | 6/2008 |
| WO | 2015043392 A1 | 4/2015 |

OTHER PUBLICATIONS

Extended European Search Report issued in European Application No. 15909040.6 dated Oct. 30, 2018, 7 pages.

* cited by examiner

MESSAGE SENDING METHOD, DEVICE, AND SYSTEM

CROSS-REFERENCE TO RELATED APPLICATIONS

This application is a continuation of International Application No. PCT/CN2015/095558, filed on Nov. 25, 2015, the disclosure of which is hereby incorporated by reference in its entirety.

TECHNICAL FIELD

The present invention relates to the field of communications technologies, and in particular, to a message sending method, a device, and a system.

BACKGROUND

Currently, instant messaging (IM) is one of popular communication manners in the world. Nowadays, many pieces of instant messaging software, for example, QQ and WeChat, provide a group function: If a group member sends a message in a group, all other members in the group can view the message. By means of this function, people having a common communication need can communicate with each other more conveniently.

However, during actual use, an existing group function usually has the following problem: In some groups, there are hundreds of or even more members. Because there are a large quantity of members, a member A may have no time to continuously pay attention to messages sent by all members. If the member A wants to view a message that is interesting to the member A in a past period of time, the member A can only search a chat history by using a keyword or a name. In this manner, messages sent by a plurality of members cannot be simultaneously obtained, and messages including a plurality of keywords cannot be obtained either. Consequently, message obtaining efficiency is low and operations are inconvenient.

SUMMARY

An objective of the present invention is to provide a message sending method, a device, and a system, so as to improve communication efficiency and convenience for a user.

To achieve the foregoing objective, the following technical solutions are used in the present invention.

A first aspect of embodiments of the present invention provides a message forwarding method, including:

adding, by a message server, a first attribute tag for some group members in a group;

creating, by the message server based on the first attribute tag, a first subgroup consisting of the some group members;

receiving, by the message server, a subgroup message including the first attribute tag; and determining, by the message server, the first subgroup based on the first attribute tag, and forwarding the subgroup message.

With reference to the first aspect, in a first possible implementation, the subgroup message further includes an operation manner for the first attribute tag; and the forwarding the subgroup message includes:

when the operation manner is forwarding, forwarding, by the message server, the subgroup message to the group members in the first subgroup; or when the operation manner is forbidding, forwarding, by the message server, the subgroup message to other group member(s) in the group than the group members in the first subgroup.

A second aspect of the embodiments of the present invention provides a message sending method, including:

receiving, by a client, an attribute tag selected by a user, where the attribute tag is used to identify a subgroup consisting of some group members in a group to which the user belongs;

receiving, by the client, information entered by the user;

generating, by the client, a subgroup message based on the attribute tag and the information entered by the user, where the subgroup message includes the attribute tag; and sending, by the client, the subgroup message to a message server, so that the message server forwards the subgroup message based on the attribute tag.

With reference to the second aspect, in a first possible implementation, the subgroup message further includes an operation manner for the attribute tag, and the operation manner includes a forwarding manner or a forbidding manner;

the forwarding manner is used to enable the message server to forward the subgroup message to the group members in the subgroup corresponding to the attribute tag; and the forbidding manner is used to enable the message server to forward the subgroup message to other group member(s) in the group than the group members in the subgroup corresponding to the attribute tag.

A third aspect of the embodiments of the present invention provides a subgroup message display method, including:

displaying, by a client, a plurality of locally received group messages;

receiving, by the client, an instruction sent by a user for starting group message filtering;

providing, by the client, a selectable attribute tag for the user based on the instruction for starting group message filtering, where the attribute tag is used to identify a subgroup of a group to which the user belongs, and the subgroup consists of some group members in the group;

filtering, by the client, the plurality of group messages based on an attribute tag selected by the user; and displaying, by the client, a subgroup message obtained after the filtering based on the attribute tag.

A fourth aspect of the embodiments of the present invention provides a message server, including:

a creation unit, configured to: add a first attribute tag for some group members in a group, and create, based on the first attribute tag, a first subgroup consisting of the some group members;

a memory, configured to store a correspondence between the group members in the first subgroup and the first attribute tag;

a receiving unit, configured to receive a subgroup message including the first attribute tag; and a forwarding unit, configured to: determine the first subgroup based on the first attribute tag, and forward the subgroup message.

A fifth aspect of the embodiments of the present invention provides a message forwarding system, including:

the client device according to the third aspect; and the message server according to the fourth aspect.

According to the message sending method, the device, and the system provided in the embodiments of the present invention, the attribute tag is added for the group members to create the subgroup in the group, so that the user can choose, based on a need, to send a message to all group members or to only subgroup members in the group, thereby improving communication efficiency and operation convenience for the user.

DESCRIPTION OF EMBODIMENTS

The technical solutions according to embodiments of the present invention are clearly described in the following with reference to the accompanying drawings.

It should be clear that the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
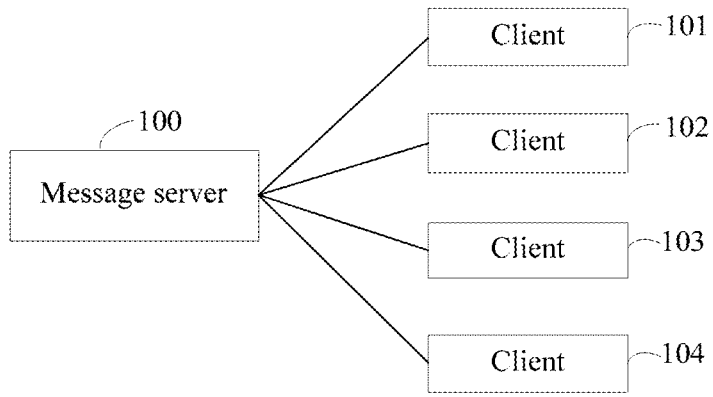
FIG. 1 is an architectural diagram of a system according to an embodiment of the present invention.

As shown in FIG. 1, an embodiment of the present invention provides a message forwarding system, including: a message server 100 and a plurality of clients. Four clients 101 to 104 are shown in the figure. The clients 101 to 104 register with the message server 100 to create a group. A member in the group, for example, the client 101, can send a group message. The message server 100 can forward, to other members in the group such as the clients 102 to 104 based on registration information, the group message sent by the client 101.

In the group in this embodiment, some group members such as the clients 101 to 103 further create a subgroup in the group by using an attribute tag, and the subgroup does not include the client 104. A member in the subgroup, for example, the client 101, can choose to send a message in the group or the subgroup. When the client 101 chooses to send a subgroup message in the subgroup, the message server 100 can forward, to other members in the subgroup such as the client 102 and the client 103 based on the attribute tag, the subgroup message sent by the client 101. Because the client 104 is not a member of the subgroup, the client 104 does not receive the subgroup message sent by the client 101.

According to this embodiment, the attribute tag is added for the group members to create the subgroup in the group, so that the user can choose, based on a need, to send a message to all group members or to only subgroup members, thereby improving communication efficiency and operation convenience for the user.

Figure 2:
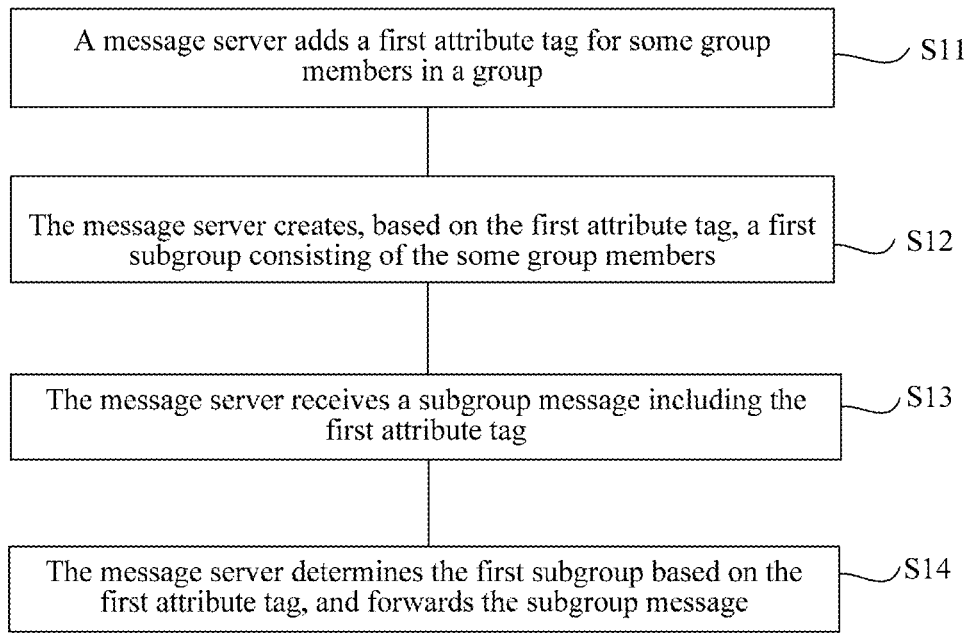
FIG. 2 is a flowchart of a method according to an embodiment of the present invention.

Based on the system shown in FIG. 1, an embodiment of the present invention provides a message forwarding method. As shown in FIG. 2, the method includes the following steps.

S11. A message server adds a first attribute tag for some group members in a group.

For example, in the system shown in FIG. 1, the message server may separately add a first attribute tag for the clients 101 to 103 in the group based on a selection operation of a user, where the attribute tag indicates an attribute of users using the clients; and store a correspondence between identifiers of the clients 101 to 103 and the first attribute tag into a memory of the message server. The attribute tag includes but is not limited to one of the following attributes: gender, address, age, job title, and project team. For example, an attribute tag of the clients 101 to 103 may be "Engineer". Alternatively, the message server may automatically add an attribute tag for some group members according to a rule set by the user. Specifically, the message server may automatically add an attribute tag for some group members based on content of group messages sent by users. For example, the message server may set an attribute tag of a group member that often sends a group message including a keyword of "ping pong" in the group to "Ping pong enthusiast", or set an attribute tag of a group member that often sends a group message including a keyword of "running" in the group to "Running enthusiast". Certainly, a manner and a rule of adding the attribute tag for the group members may be flexibly set and determined by a person of ordinary skill in the art based on experience and an actual situation, and are not enumerated herein.

S12. The message server creates, based on the first attribute tag, a first subgroup consisting of the some group members.

S13. The message server receives a subgroup message including the first attribute tag.

When a group member in the first subgroup sends a subgroup message to other group member(s) in the first subgroup, the subgroup message is first sent to the message server.

S14. The message server determines the first subgroup based on the first attribute tag, and forwards the subgroup message.

The subgroup message further includes an operation manner for the first attribute tag, and the operation manner is "forwarding" or "forbidding". When the operation manner is "forwarding", the forwarding the subgroup message includes: forwarding, by the message server, the subgroup message to the group members in the first subgroup. When the operation manner is "forbidding", the forwarding the subgroup message includes: forwarding, by the message server, the subgroup message to other group member(s) in the group than the group members in the first subgroup.

In addition, the subgroup message may further include a second attribute tag and an operation manner for the second attribute tag. The message server forwards the subgroup message based on the first attribute tag, the operation manner for the first attribute tag, the second attribute tag, and the operation manner for the second attribute tag.

Based on the system shown in FIG. 1, an embodiment further provides a subgroup message sending method, and the method is performed by a client.

Figure 4A:
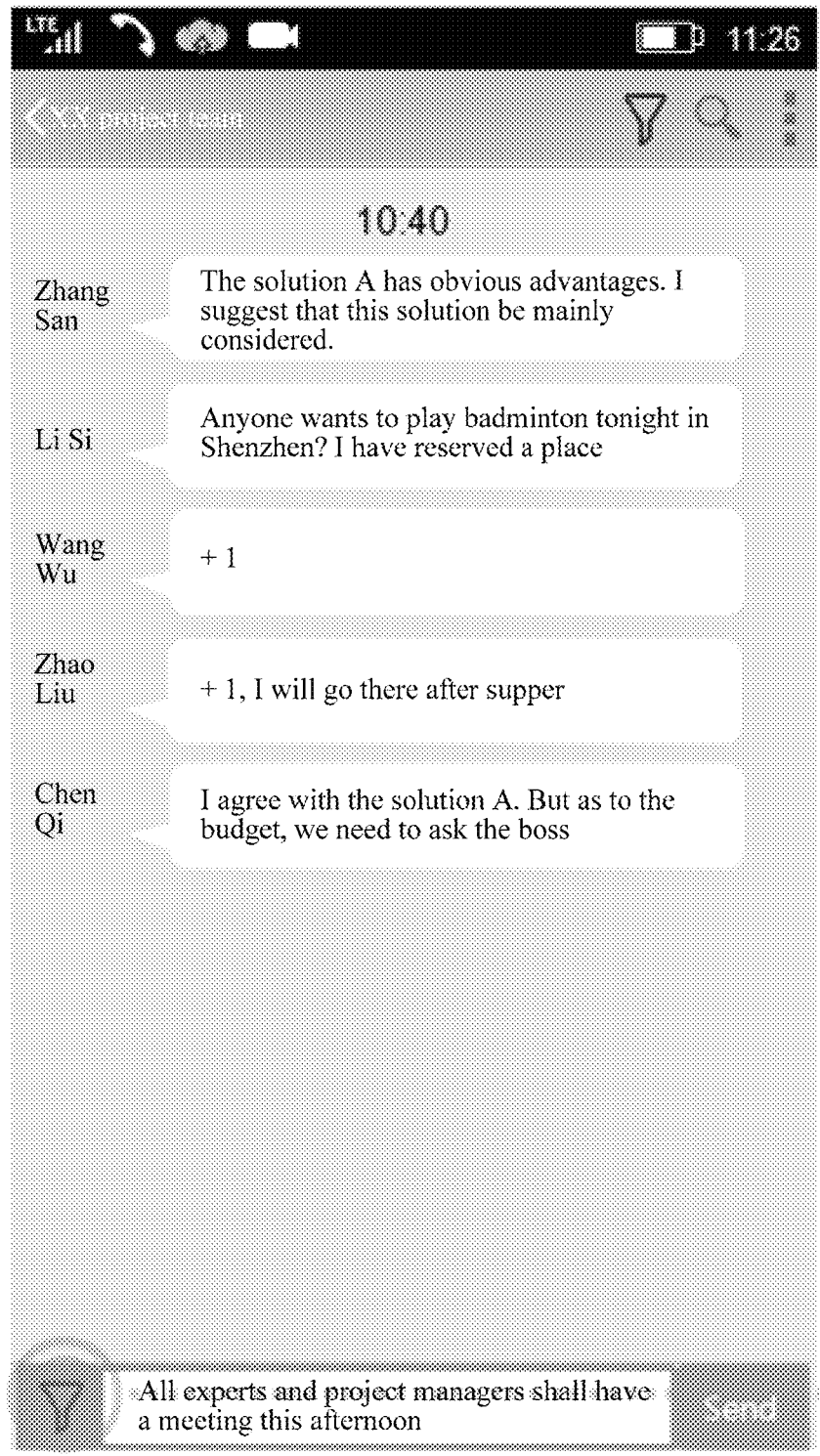
FIG. 4a to FIG. 4d are schematic diagrams of an operation interface according to an embodiment of the present invention.

Before the client performs the foregoing method, a user enters content of a message that needs to be sent, and triggers, for the client, an instruction used to start group message filtering. As shown in FIG. 4a, on a message sending operation interface of the client, the user enters, in a message sending area at the bottom of the interface, message content of "All experts and project managers shall have a meeting this afternoon" that needs to be sent. Then, the user taps, an operation button at a lower left corner for starting message filtering. The operation button triggers, for the client, the instruction used to start group message filtering.

Figure 3:
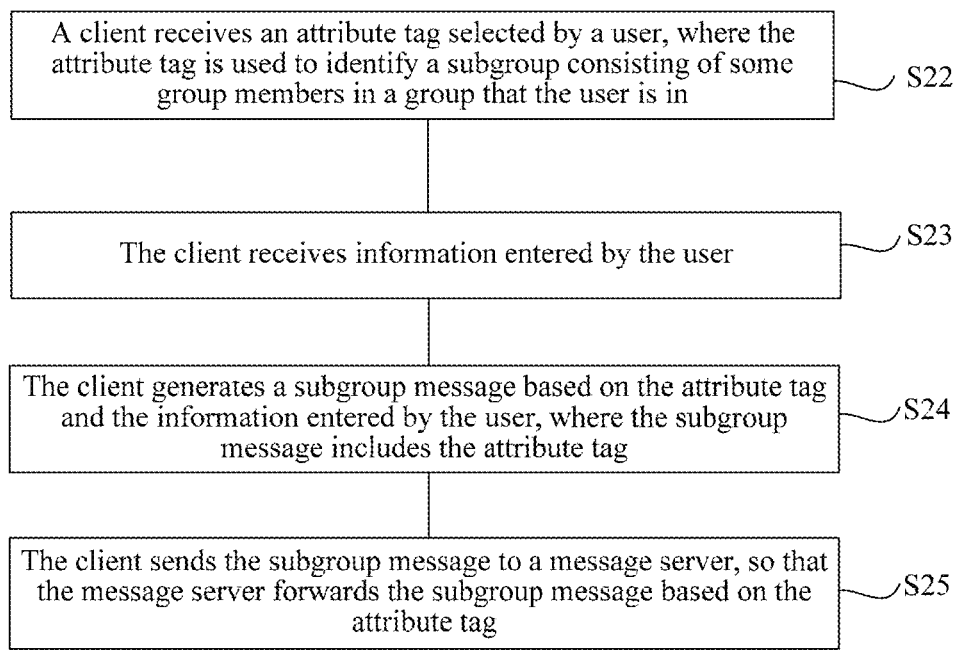
FIG. 3 is a flowchart of a method according to another embodiment of the present invention.

After that, the client performs operations shown in FIG. 3.

S22. The client receives an attribute tag selected by a user, where the attribute tag is used to identify a subgroup consisting of some group members in a group to which the user belongs.

Figure 4B:
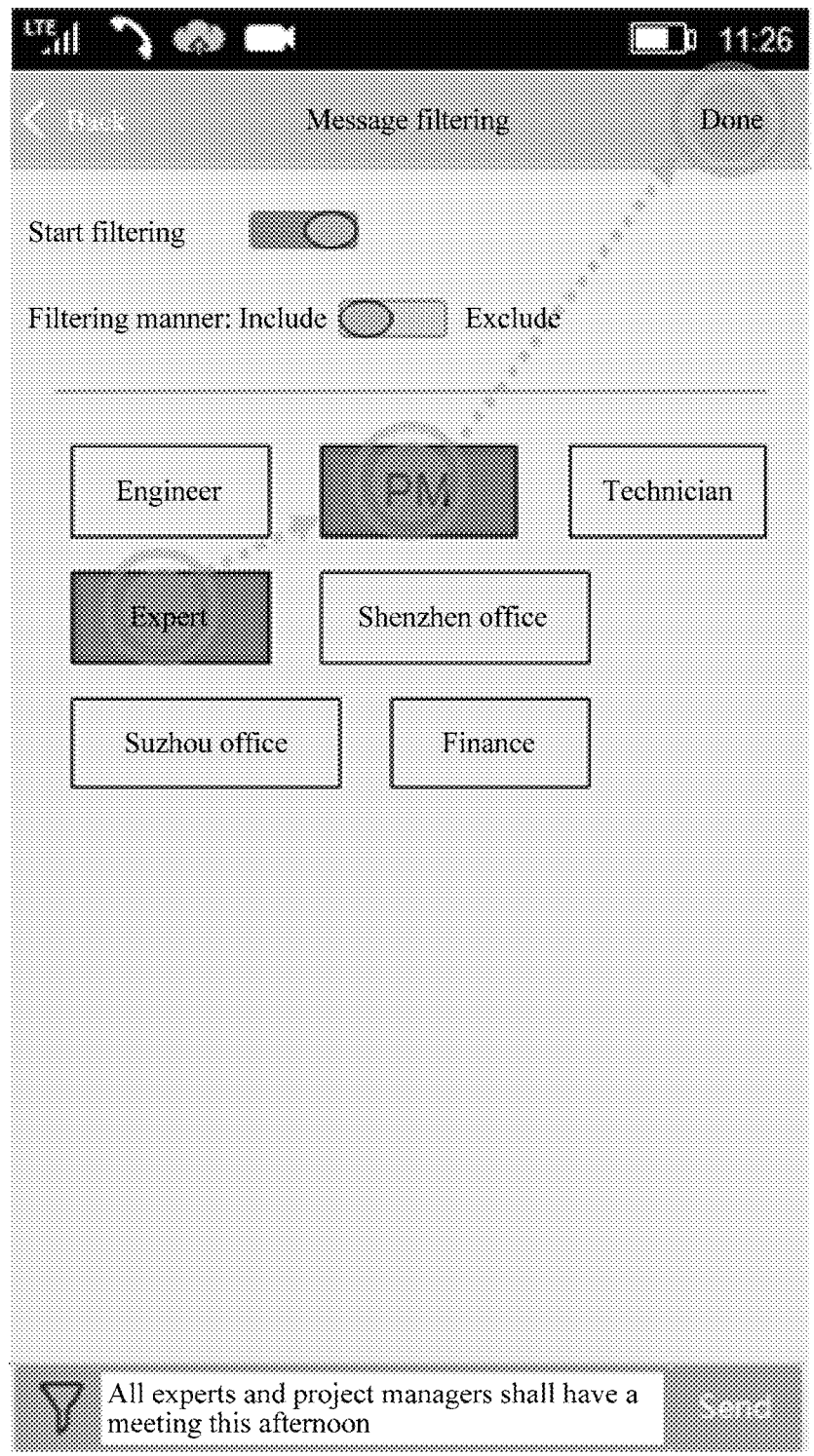

In an implementation, the client receives an instruction that is entered by the user on an operation interface of the client and that is used to start group message filtering, and starts a message filtering operation interface based on the instruction. The message filtering operation interface is used to provide a selectable attribute tag for the user. As shown in FIG. 4b, the client starts the message filtering operation interface. Several attribute tags used for message filtering are displayed on the message filtering operation interface. After selecting attribute tags of "Expert" and "Project manager PM" from the attribute tags, the user taps an operation button "Done" at an upper right corner.

S23. The client receives information entered by the user.

Figure 4C:
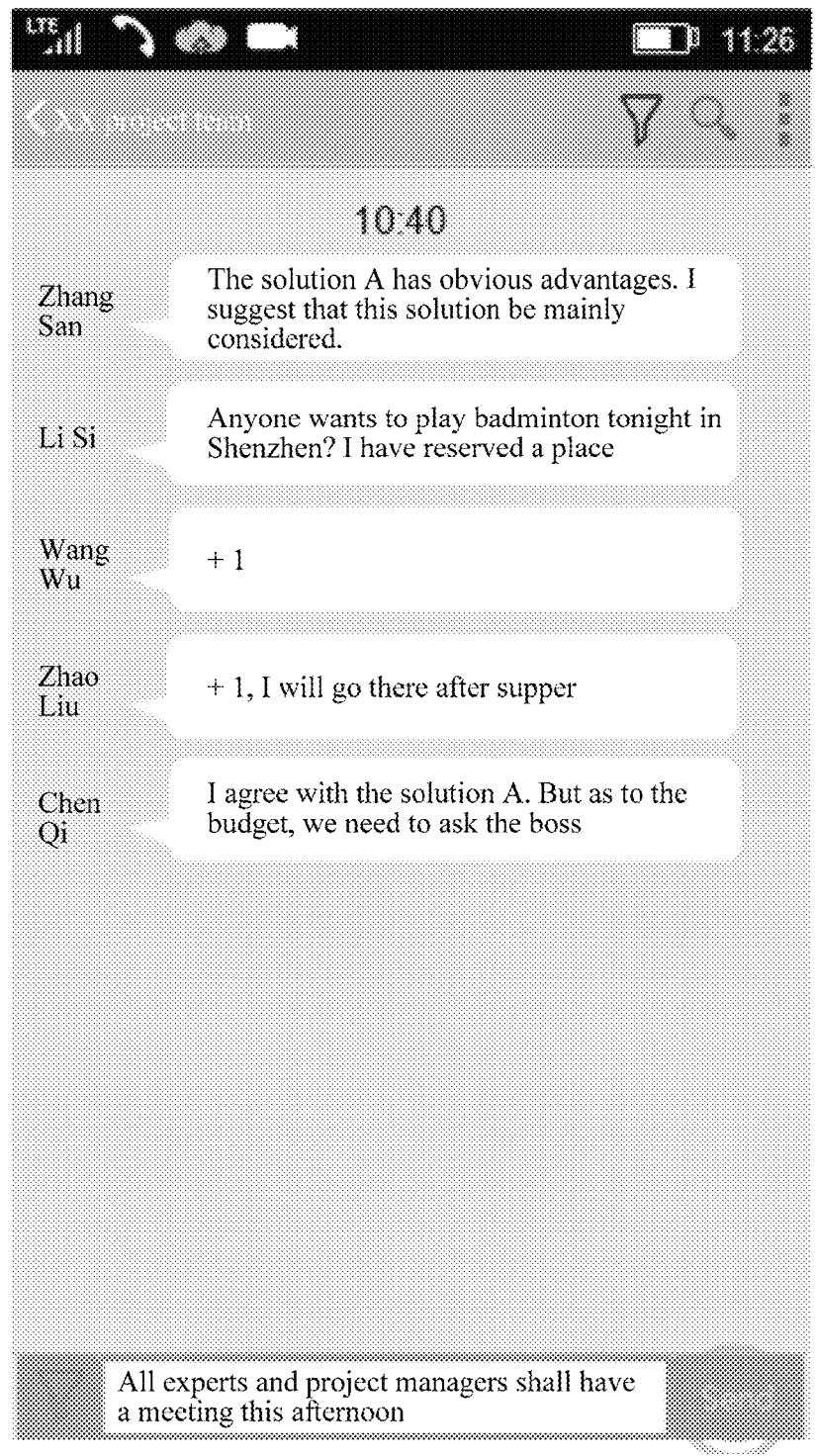

The client receives, on a message sending operation interface, the information entered by the user. As shown in FIG. 4c, the client returns to the message sending operation interface, and the user taps an operation button "Send" at a lower right corner. In this case, information entered by the user is input to the client.

S24. The client generates a subgroup message based on the attribute tag and the information entered by the user, where the subgroup message includes the attribute tag.

S25. The client sends the subgroup message to a message server, so that the message server forwards the subgroup message based on the attribute tag.

Figure 4D:
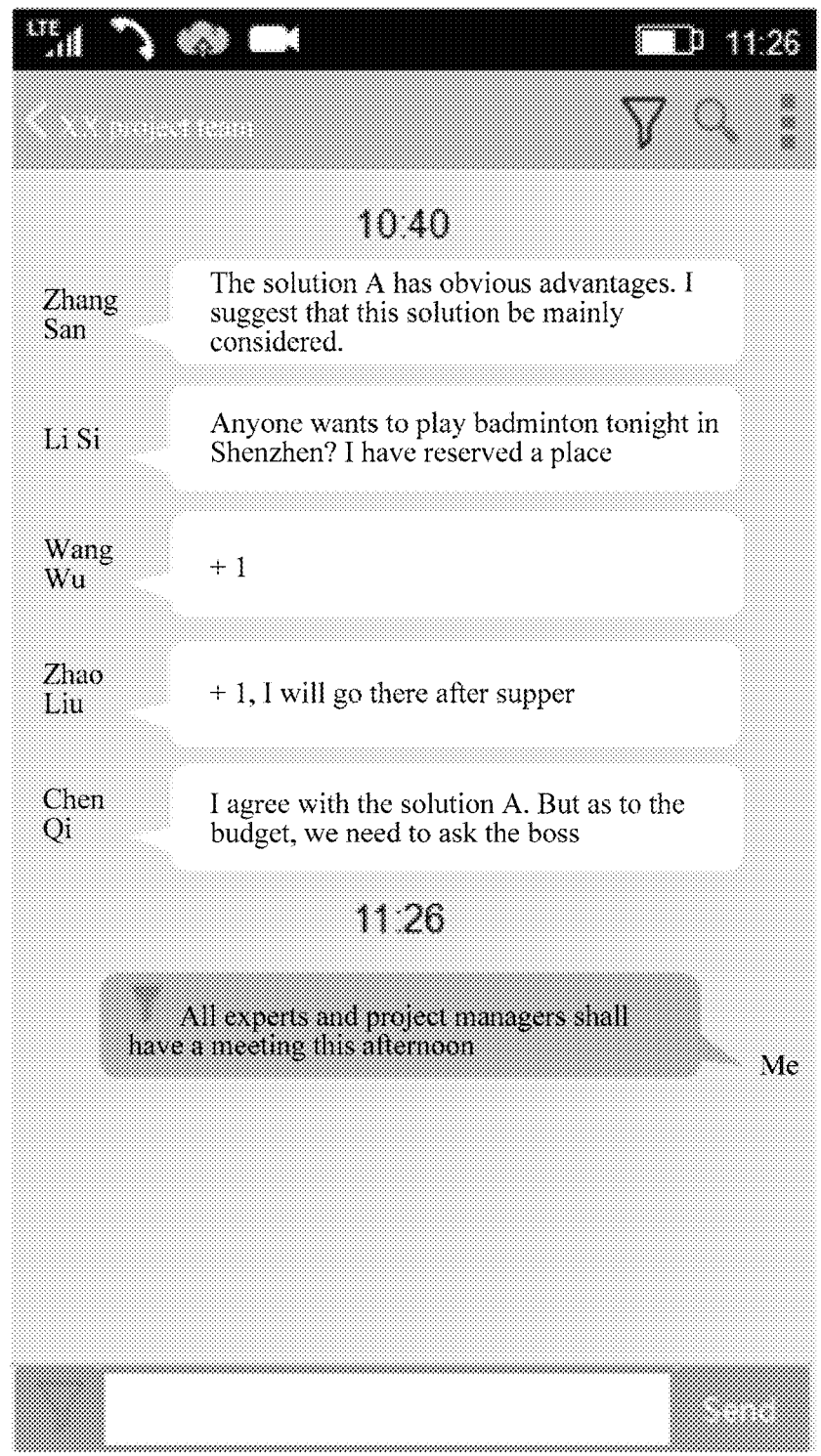

As shown in FIG. 4d, the client sends a message of "All experts and project managers shall have a meeting this afternoon" to the message server, and displays the sent message at the client.

Figure 5:
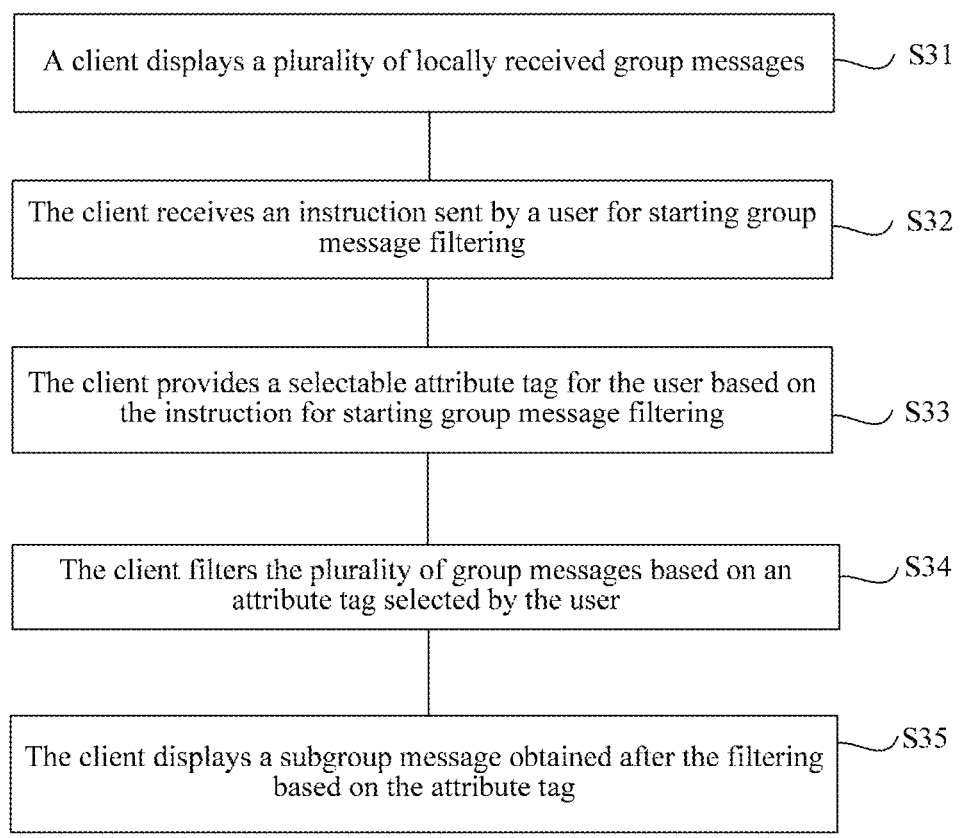
FIG. 5 is a flowchart of a method according to another embodiment of the present invention.

The client in the present invention not only can send a subgroup message, but also can display the subgroup message. As shown in FIG. 5, when displaying the subgroup message, the client may further perform the following operations:

S31. The client displays a plurality of locally received group messages.

S32. The client receives an instruction sent by a user for starting group message filtering.

Figure 6A:
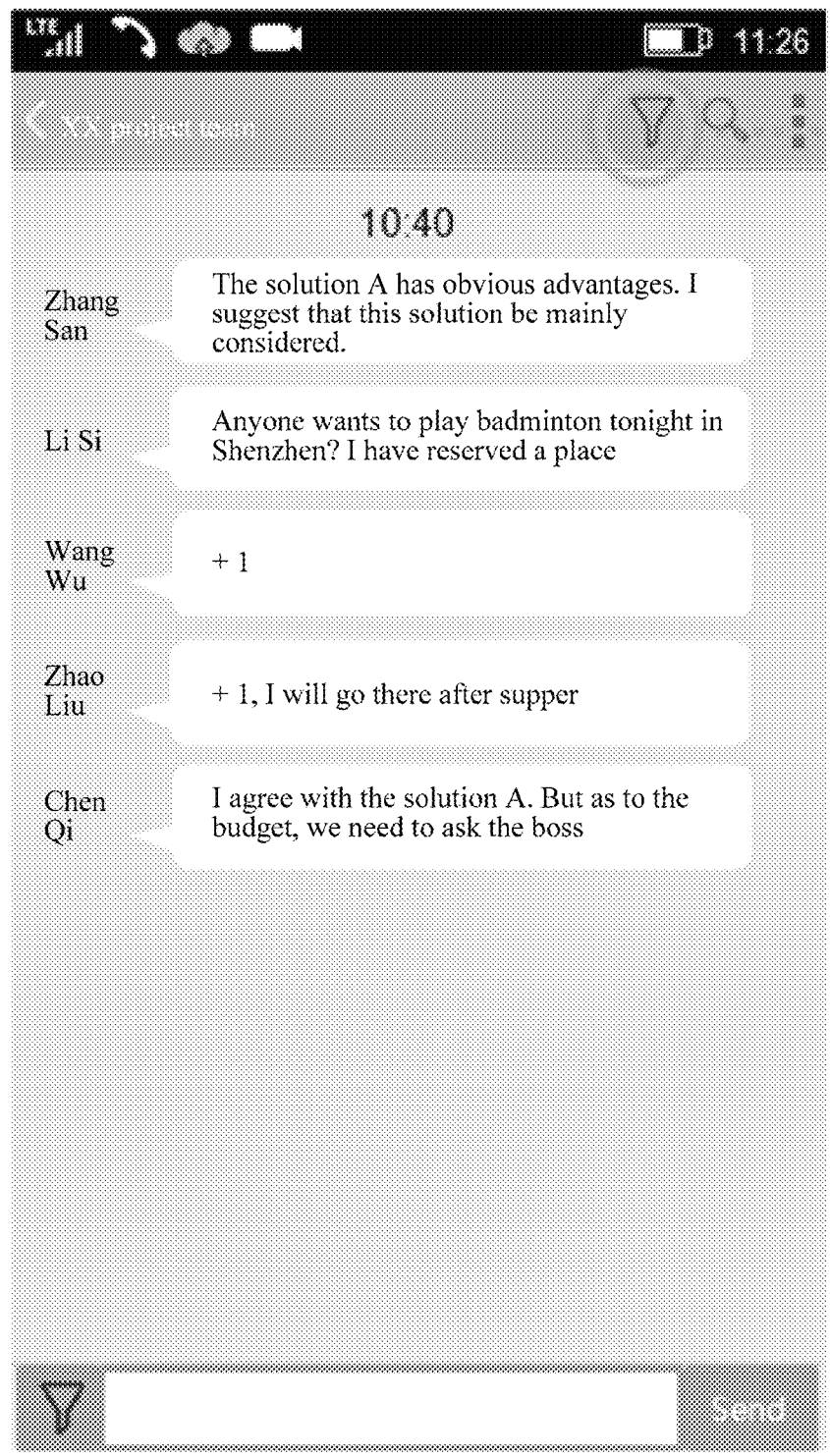
FIG. 6a to FIG. 6c are schematic diagrams of an operation interface according to another embodiment of the present invention.

As shown in FIG. 6a, the plurality of locally received group messages are displayed on an operation interface of the client. The user taps a filtering function viewing button at an upper right corner, so as to input the instruction for starting group message filtering to the client.

S33. The client provides a selectable attribute tag for the user based on the instruction for starting group message filtering.

Figure 6B:
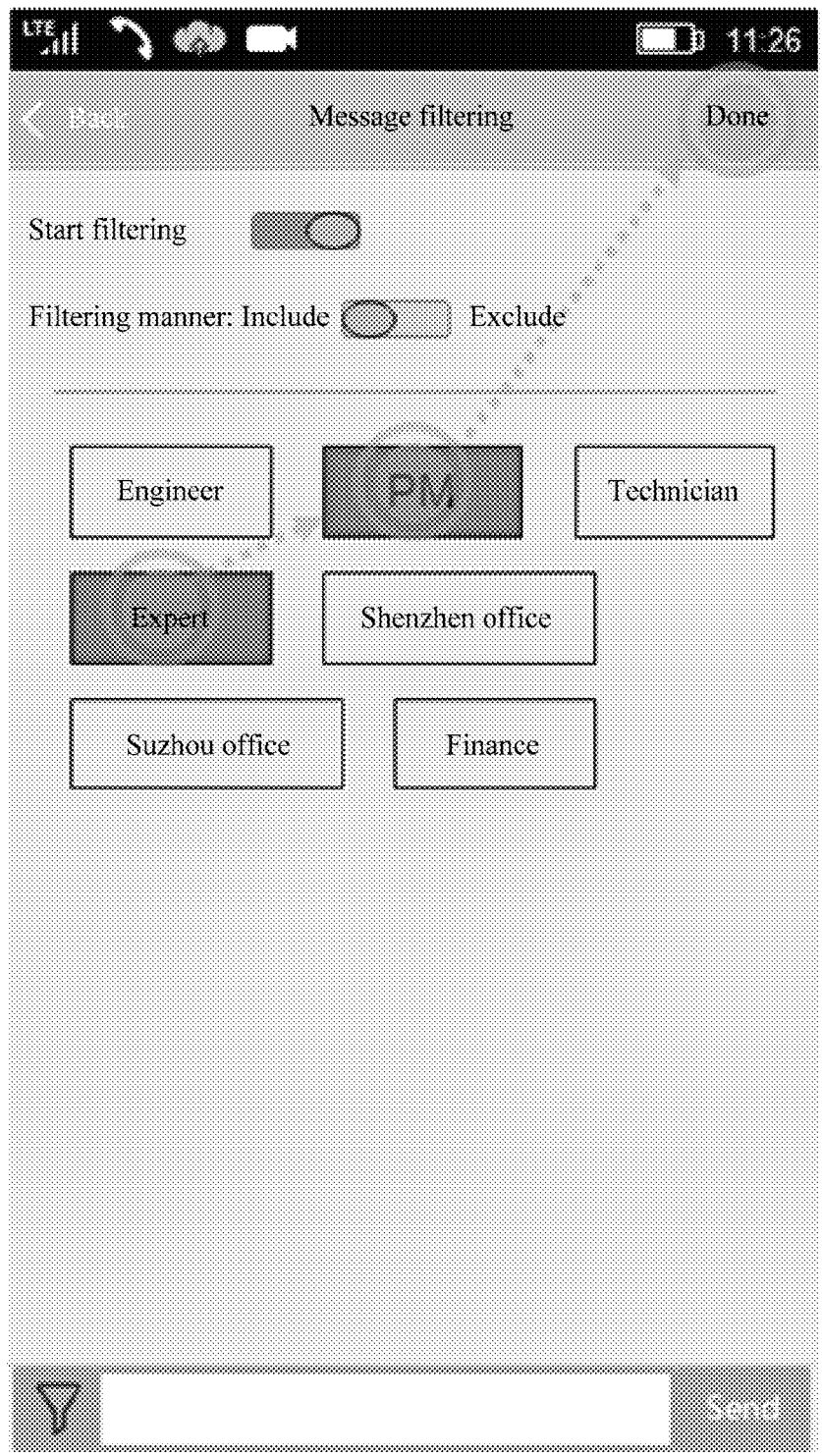

The client starts a group message filtering operation interface, so that the user can select an attribute tag used to filter the plurality of group messages. As shown in FIG. 6b, functions including an operation manner (a filtering manner) and a plurality of attribute tags are displayed on the group message filtering operation interface. A filtering manner selected by the user is "Include", and attribute tags selected by the user are "Expert" and "PM". "Include" in FIG. 6b means that only a group message sent by a group member having a corresponding attribute tag is displayed. "Exclude" means that a group message sent by a group member having a corresponding attribute tag is hidden.

S34. The client filters the plurality of group messages based on an attribute tag selected by the user.

Specifically, the client queries, based on the attribute tag selected by the user, the message server for a list of members that satisfy the attribute tag, and filters the locally received group messages based on an operation manner for the attribute tag and the list of members obtained by means of query.

S35. The client displays a subgroup message obtained after the filtering based on the attribute tag.

Figure 6C:
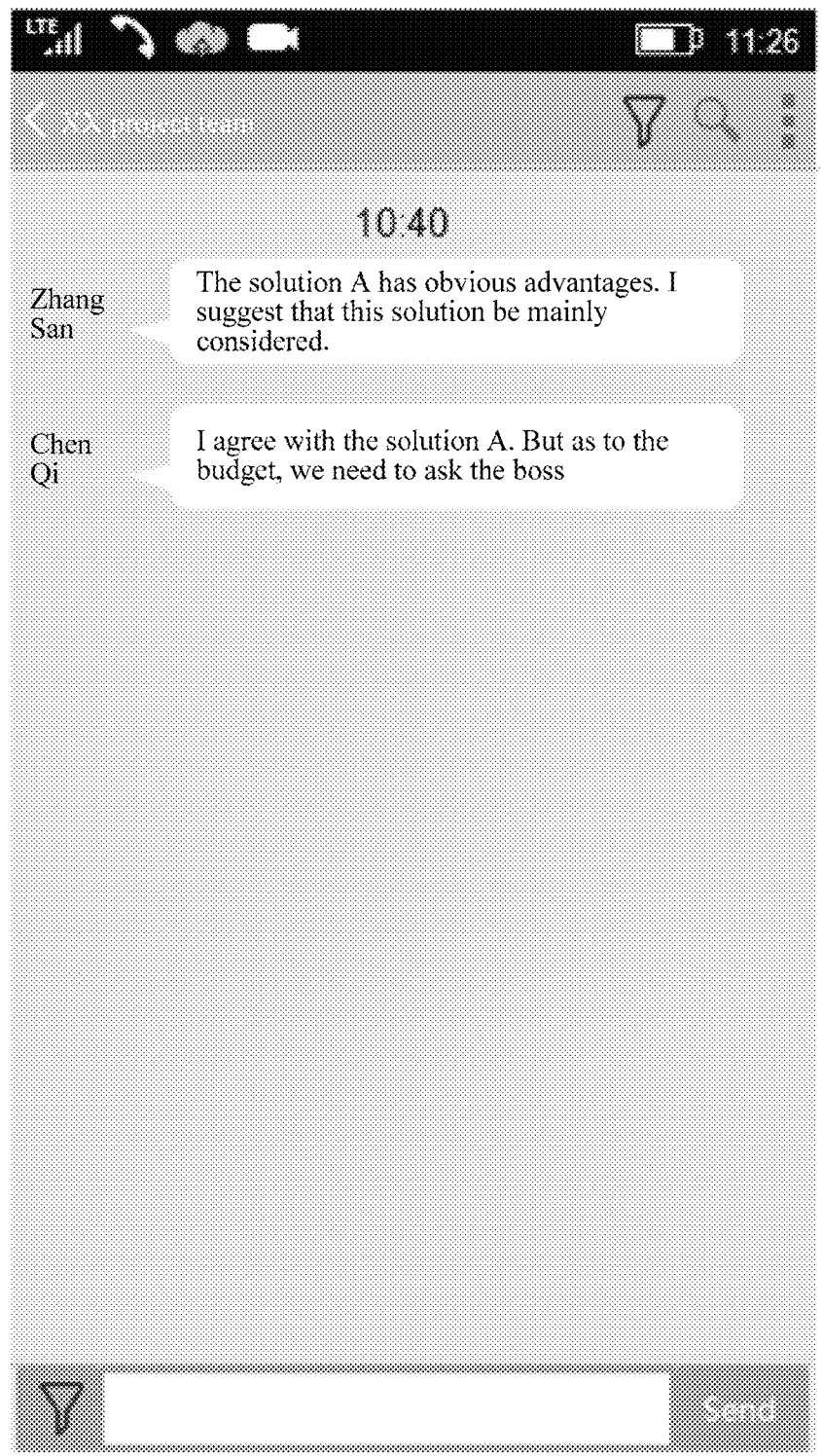

Specifically, the client displays, on the operation interface, the subgroup message obtained after the filtering based on the attribute tag. As shown in FIG. 6c, only group messages sent by members "Zhang San" and "Chen Qi" having the attribute tag of "PM" or "Expert" are displayed on the operation interface, and group messages sent by members "Li Si", "Wang Wu", and "Zhao Liu" who do not have the attribute tag of "PM" or "Expert" are hidden.

According to the method in the embodiments of the present invention, displaying of all group messages or some group messages can be flexibly selected based on a need of the user, so that a time used by the user to browse group messages can be significantly reduced, and operations are simple.

Figure 7A:
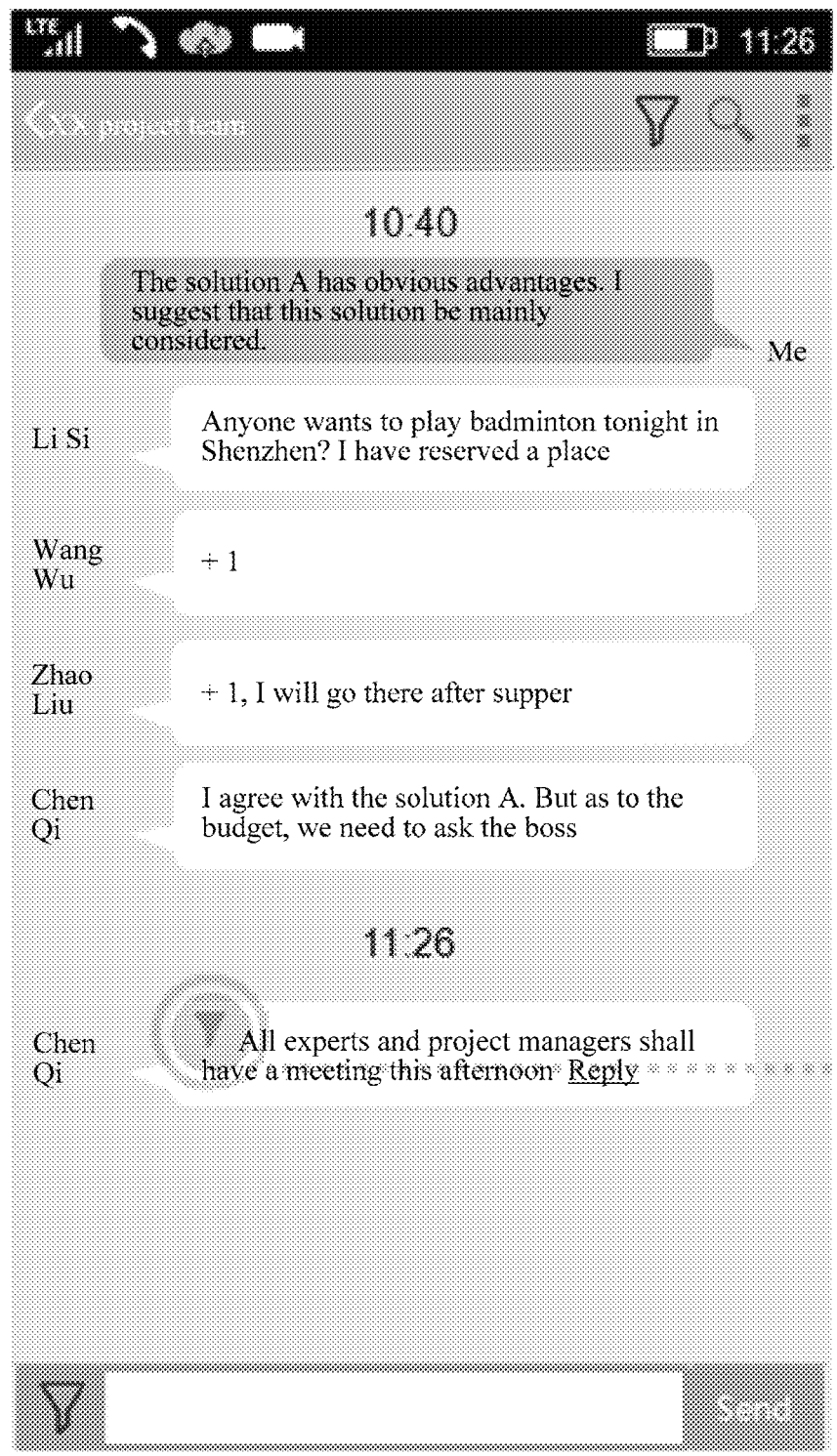
FIG. 7a and FIG. 7b are schematic diagrams of another operation interface according to another embodiment of the present invention.
Figure 7B:
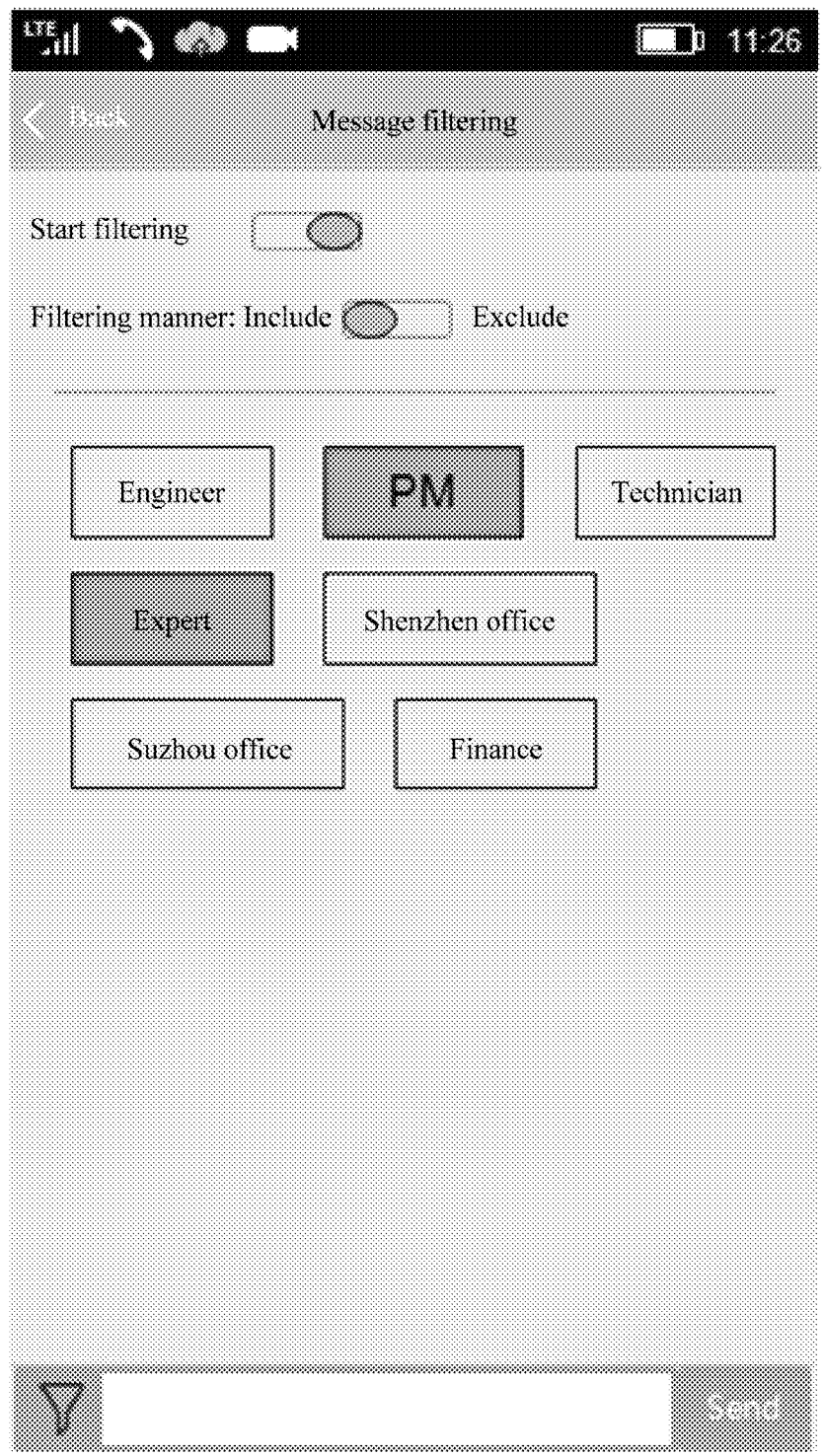

To further facilitate an operation of the user, when receiving a group message sent by the message server and displaying the group message, the client differentially displays a group message having an attribute tag. As shown in FIG. 7a, a message sent by "Chen Qi" has an attribute tag, and a button "View an attribute tag" is displayed at the left of the message. When a user of a recipient client taps the button "View an attribute tag", attribute tag information of the message can be popped up, as shown in FIG. 7b, so as to facilitate viewing of the user.

Figure 8A:
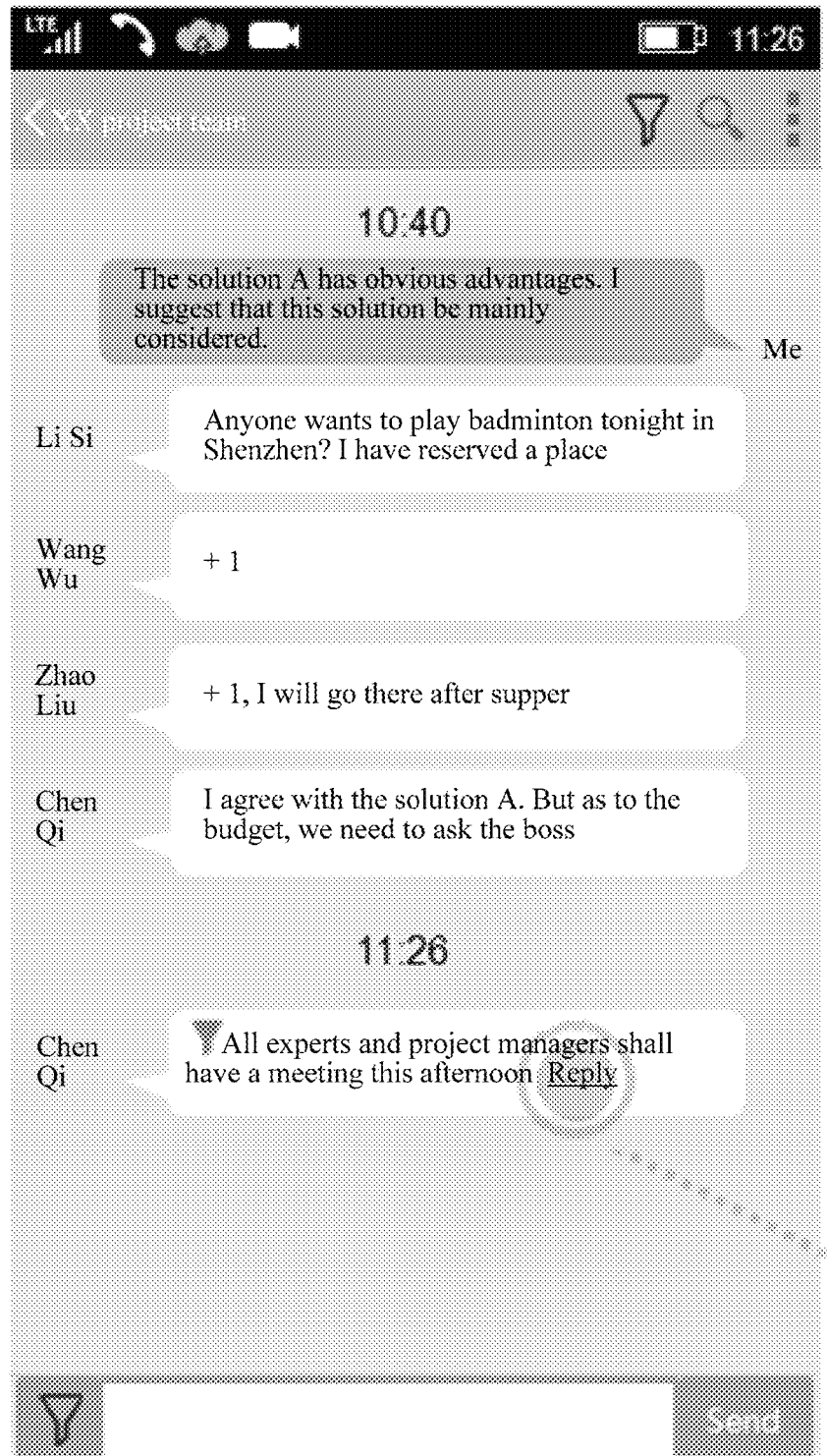
FIG. 8a to FIG. 8c are schematic diagrams of still another operation interface according to another embodiment of the present invention.
Figure 8B:
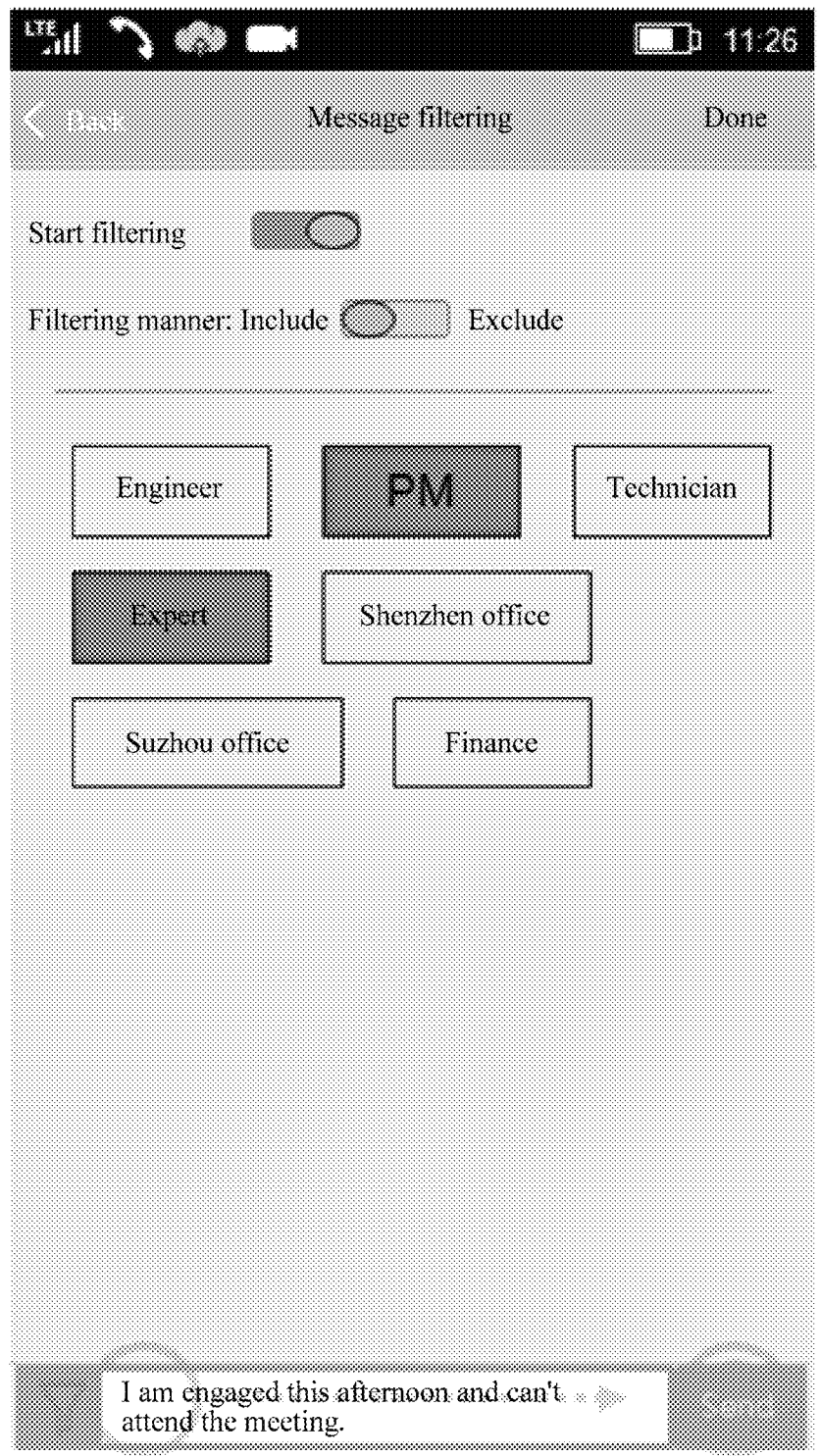
Figure 8C:
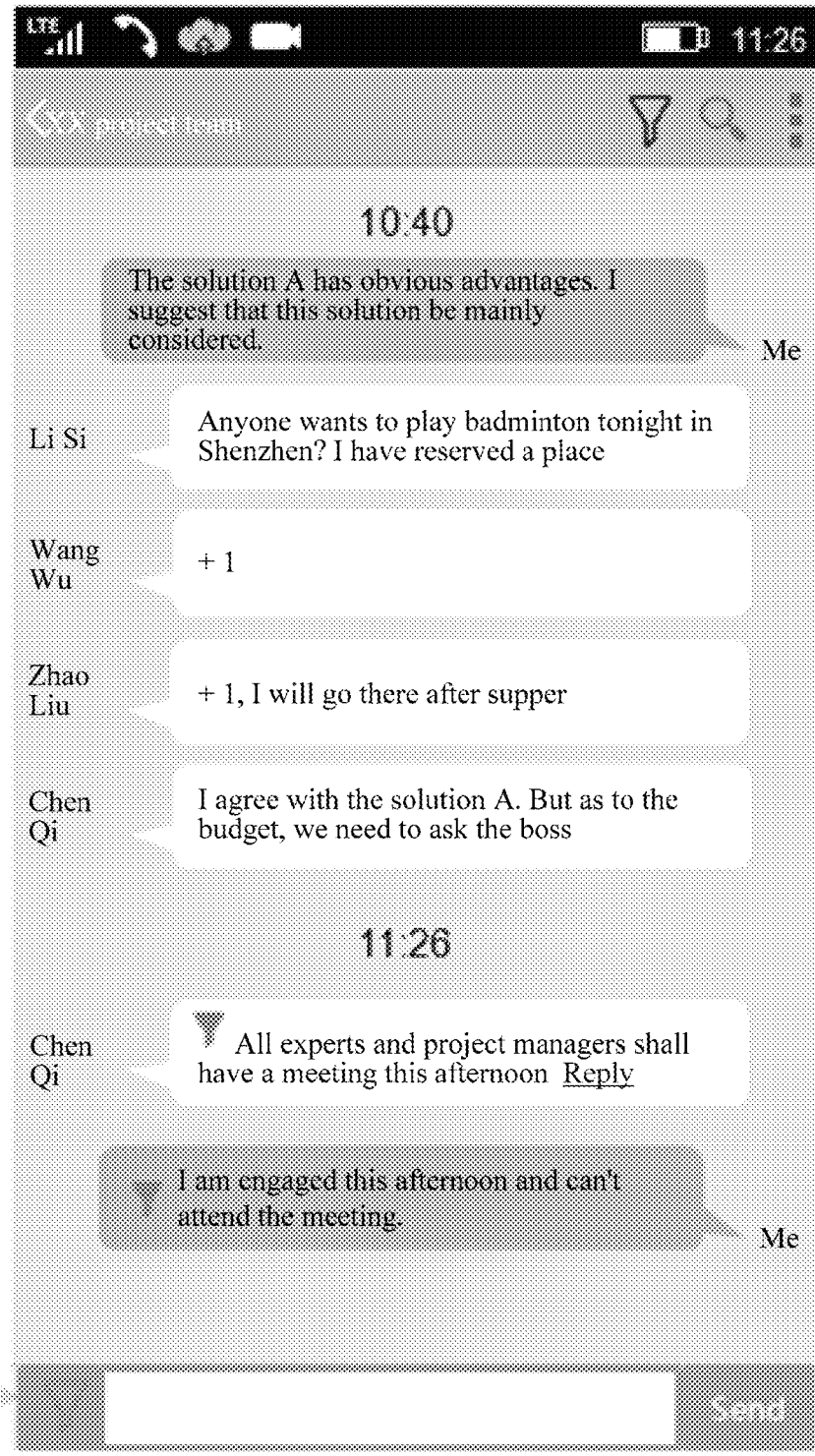

As shown in FIG. 8a, in addition, the client provides a shortcut "Reply" button for group messages having an attribute tag. The user taps the "Reply" button, and the client automatically selects, for the user, a group sending message having an attribute tag the same as that carried in the group messages. As shown in FIG. 8b, the user enters, in a message entering area at a lower part of a message filtering interface, a message that needs to be sent, and then taps a "Send" button. The client displays that the sent group message has an attribute tag. In addition, as shown in FIG. 8c, the client sends, to the message server, content of the message entered by the user, and the message server forwards, based on the attribute tag carried in the message, the content of the message to other group member(s) having the attribute tag.

In addition, an ordinary group member can view an attribute tag of the ordinary group member or of another group member, but cannot perform editing. A group administrator can view attribute tags of all group members and can perform editing.

Figure 9:
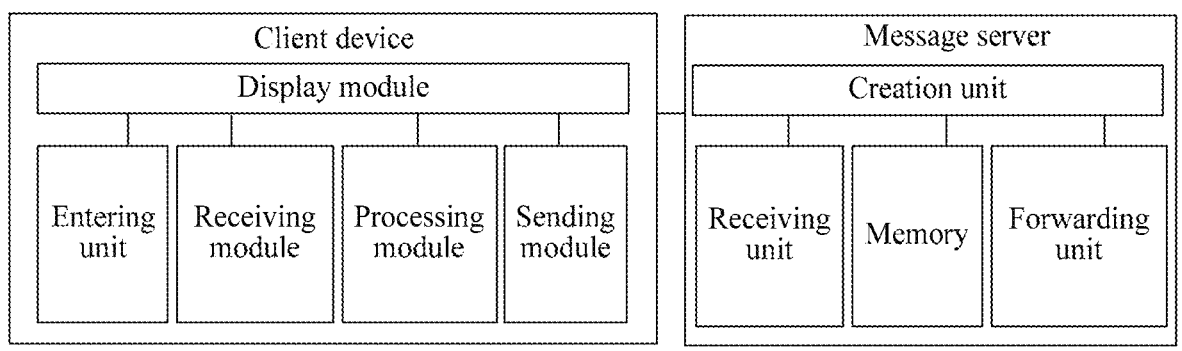
FIG. 9 is a structural block diagram of a device according to an embodiment of the present invention.

As shown in FIG. 9, to perform the method in the foregoing embodiments, a client device in an embodiment of the present invention includes an entering module, a receiving module, a processing module, a sending module, and a display module. The entering module is configured to enter an operation instruction and information to the client device by a user. The receiving module is configured to receive an attribute tag selected by the user and the entered information. The attribute tag is used to identify a subgroup consisting of some group members in a group to which the user belongs. The receiving module is further configured to receive a feedback message sent by a message server. The display module specifically is a display screen, and is configured to display a message filtering operation interface, so that the user enters the operation instruction and the information. The processing module is configured to generate a subgroup message based on the attribute tag and the information entered by the user. The subgroup message includes the attribute tag. The sending module is configured to: send the subgroup message to the message server, so that the message server forwards the subgroup message based on the attribute tag; and send a group message and a request message to the message server.

A message server in an embodiment of the present invention includes a creation unit, a receiving unit, a forwarding unit, and a memory. The creation unit is configured to: add a first attribute tag for some group members in a group, and create, based on the first attribute tag, a first subgroup consisting of the some group members. The receiving unit is configured to receive a subgroup message including the first attribute tag. The forwarding unit is configured to: determine the first subgroup based on the first attribute tag, and forward the subgroup message. The memory is configured to store a correspondence between the group members in the first subgroup and the first attribute tag.

A person of ordinary skill in the art may understand that all or a part of the processes of the method embodiments may be implemented by a program instructing relevant hardware. The program may be stored in a computer readable storage medium. When the program runs, the steps of the method embodiments are performed. The foregoing storage medium includes a ROM (read-only memory, Read-Only Memory), a RAM (random access memory, Random-Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention.

What is claimed is:

1. A subgroup message display method, comprising:
displaying, by a client device, a plurality of locally received group messages;
receiving, by the client device in response to a user tapping a displayed filtering operation button, an instruction for starting group message filtering;
providing, by the client device in response to the instruction for starting the group message filtering, a first display interface to the user displaying a plurality of selectable attribute tags, wherein each selectable attribute tag of the plurality of selectable attribute tags identifies a subgroup of a group to which the user belongs, wherein each identified subgroup corresponds to a plurality of group members that are comprised in the group, and wherein a first selectable attribute tag of the plurality of selectable attribute tags is associated with a particular group member based on a key word comprised in one or more group messages previously sent by the particular group member;
receiving, by the client device via the first display interface, a selection by the user of the first selectable attribute tag and a second selectable attribute tag that are comprised in the plurality of selectable attribute tags;
in response to the selection of the first selectable attribute tag and the second selectable attribute tag, automatically filtering, by the client device, the plurality of locally received group messages based on the first selectable attribute tag and the second selectable attribute tag by querying a message server for a list of a first plurality of group members corresponding to the subgroup identified by the first selectable attribute tag and a second plurality of group members corresponding to the subgroup identified by the second selectable attribute tag;
displaying, by the client device, one or more subgroup messages obtained after the filtering, wherein the one or more subgroup messages are messages sent by the first plurality of group members and the second plurality of group members included on the list, wherein each displayed subgroup message of the one or more subgroup messages which has been associated with one or more attribute tags comprises a respective attribute button to view the associated one or more attribute tags and a respective reply button displayed with the displayed subgroup message;
receiving, by the client device, a selection of a first reply button associated with a first subgroup message of the one or more subgroup messages which has been associated with the first selectable attribute tag and the second selectable attribute tag;
in response to receiving the selection of the first reply button, automatically selecting, by the dent device, the first selectable attribute tag and the second selectable attribute tag and providing the user with a second display interface indicating selection of the first selectable attribute tag and the second selectable attribute tag and a message entering area for the user to enter a reply message; and
in response to the user entering the reply message and tapping a send button on the second display interface, sending the reply message to the message server for forwarding of the reply message to the first plurality of group members corresponding to the first selectable attribute tag and the second plurality of group members corresponding to the second selectable attribute tag.

2. The method according to claim 1, wherein the receiving, by the dent device in response to the user tapping the displayed filtering operation button, an instruction for starting the group message filtering comprises:
receiving, by the client device, an instruction entered by the user on an operation interface of the client device and used to start the group message filtering.

3. The method according to claim 1, wherein the displaying, by the client device, the one or more subgroup messages obtained after the filtering comprises:
displaying, by the client device on an operation interface of the client device, a group message in the plurality of locally received group messages that satisfies the first selectable attribute tag or the second selectable attribute tag, and hiding a group message that is in the plurality of locally received group messages and that satisfies neither the first selectable attribute tag nor the second selectable attribute tag.

4. The method according to claim 1, wherein:
the first display interface includes a group message filtering operation interface; and the group message filtering operation interface comprises an operation manner and the plurality of selectable attribute tags, wherein the operation manner comprises an exclude option and an include option, wherein the include option indicates that only a group message sent by a subgroup member corresponding to the first selectable attribute tag or the second selectable attribute tag is displayed, and wherein the exclude option indicates that a group message sent by a subgroup member corresponding to the first selectable attribute tag or the second selectable attribute tag is hidden.

5. The method according to claim 1, wherein the first selectable attribute tag comprises at least one of a gender, an address, an age, a job title, or a project team.

6. The method according to claim 1, further comprising:
receiving, by the client device and from the user, an additional selection of the first selectable attribute tag; and
in response to receiving the additional selection of the first selectable attribute tag from the user, sending, by the client device and to the message server, a particular subgroup message, wherein the particular subgroup message comprises the first selectable attribute tag, and wherein the first selectable attribute tag is used by the message server to identify the first plurality of group members corresponding to the first selectable attribute tag and forward the particular subgroup message to the first plurality of group members.

7. The method according to claim 6, wherein:
the receiving, by the client device and from the user, the additional selection of the first selectable attribute tag comprises receiving, by the client device and from the user, an additional selection of the second selectable attribute tag;
the particular subgroup message comprises the first selectable attribute tag and the second selectable attribute tag; and
the second selectable attribute tag is used by the message server to forward the particular subgroup message to the second plurality of group members corresponding to the second selectable attribute tag.

8. The method according to claim 1, wherein the displaying the one or more subgroup messages comprises:
querying, by the client device, the message server for the first plurality of group members corresponding to the first selectable attribute tag and the second plurality of group members corresponding to the second selectable attribute tag; and
displaying, by the client device, the one or more subgroup messages sent by the first plurality of group members and the second plurality of group members.

9. The method according to claim 1, wherein the instruction for starting the group message filtering is received after the user enters content of a message to be sent and taps the displayed filtering operation button.

10. An apparatus, comprising:
at least one processor; and
a non-transitory memory coupled to the at least one processor and storing programming instructions for execution by the at least one processor, wherein the programming instructions instruct the at least one processor to perform operations comprising:
displaying, by a client device, a plurality of locally received group messages;
receiving, by the client device in response to a user tapping a displayed filtering operation button, an instruction for starting group message filtering;
providing, by the client device in response to the instruction for starting the croup message filtering, a first display interface to the user displaying a plurality of selectable attribute tags, wherein each selectable attribute tag of the plurality of selectable attribute tags identifies a subgroup of a group to which the user belongs, wherein each identified subgroup corresponds to a plurality of group members that are comprised in the group, and wherein a first selectable attribute tag of the plurality of selectable attribute tags is associated with a particular group member based on a key word comprised in one or more group messages previously sent by the particular group member;
receiving, by the client device via the first display interface, a selection by the user of the first selectable attribute tag and a second selectable attribute tag that are comprised in the plurality of selectable attribute tags;
in response to the selection of the first selectable attribute tag and the second selectable attribute tag, automatically filtering, by the client device, the plurality of locally received group messages based on the first selectable attribute tag and the second selectable attribute tag by querying a message server for a list of a first plurality of group members corresponding to the subgroup identified by the first selectable attribute tag and a second plurality of group members corresponding to the subgroup identified by the second selectable attribute tag;
displaying, by the client device, one or more subgroup messages obtained after the filtering, wherein the one or more subgroup messages are messages sent by the first plurality of group members and the second plurality of group members included on the list, wherein each displayed subgroup message of the one or more subgroup messages which has been associated with one or more attribute tags comprises a respective attribute button to view the associated one or more attribute to s and a respective reply button displayed with the displayed subgroup message;
receiving, by the client device, a selection of a first reply button associated with a first subgroup message of the one or more subgroup messages which has been associated with the first selectable attribute tag and the second selectable attribute tag;
in response to receiving the selection of the first reply button, automatically selecting, by the client device, the first selectable attribute tag and the second selectable attribute tag and providing the user with a second display interface indicating selection of the first selectable attribute tag and the second selectable attribute tag and a message entering area for the user to enter a reply message; and
in response to the user entering the replay message and tapping a send button on the second display interface, sending the reply message to the message server for forwarding of the reply message to the first plurality of group members corresponding to the first selectable attribute tag and the second plurality of group members corresponding to the second selectable attribute tag.

11. The apparatus according to claim 10, wherein the receiving, by the client device in response to the user tapping the displayed filtering operation button, the instruction for starting the group message filtering comprises:

receiving, by the client device, an instruction entered by the user on an operation interface of the client device and used to start the group message filtering.

12. The apparatus according to claim 10, wherein the displaying, by the client device, the one or more subgroup messages obtained after the filtering comprises:
displaying, by the client device on an operation interface of the client device, a group message in the plurality of locally received group messages that satisfies the first selectable attribute tag or the second selectable attribute tag, and hiding a group message that is in the plurality of locally received group messages and that satisfies nether the first selectable attribute tag nor the second selectable attribute tag.

13. The apparatus according to claim 10, wherein:
the first display interface includes a group message filtering operation interface; and
the group message filtering operation interface comprises an operation manner and the plurality of selectable attribute tags, wherein the operation manner comprises an exclude option and an include option, wherein the include option indicates that only a group message sent by a subgroup member corresponding to the first selectable attribute tag or the second selectable attribute tag is displayed, and wherein the exclude option indicates that a group message sent by a subgroup member corresponding to the first selectable attribute tag or the second selectable attribute tag is hidden.

14. The apparatus according to claim 10, wherein the first selectable attribute tag comprises at least one of a gender, an address, an age, a job title, or a project team.

15. A system, comprising:
a message server, configured to perform operations comprising:
adding a first selectable attribute tag for a first plurality of group members in a group;
creating, based on the first selectable attribute tag, a first subgroup comprising the first plurality of group members;
receiving a subgroup message comprising the first selectable attribute tag;
determining the first subgroup based on the first selectable attribute tag; and
forwarding the subgroup message to the determined first subgroup; and
a client device, configured to perform operations comprising:
displaying a plurality of locally received group messages;
in response to a user tapping a displayed filtering operation button, receiving an instruction for starting group message filtering;
in response to receiving the instruction for starting the group message filtering, providing a first display interface to the user displaying a plurality of selectable attribute tags, wherein each selectable attribute tag of the plurality of selectable attribute tags identifies a subgroup to which the user belongs, wherein each identified subgroup corresponds to a plurality of group members that are comprised in the group, and wherein the first selectable attribute tag of the plurality of selectable attribute tags is associated with a particular group member based on a key word comprised in one or more group message previously sent by the particular group member;
receiving a selection by the user of the first selectable attribute tag and a second selectable attribute tag that are comprised in the plurality of selectable attribute tags;
in response to the selection of the first selectable attribute tag and the second selectable attribute tag, automatically filtering the plurality of locally received group messages based on the first selectable attribute tag and the second selectable attribute tag by querying the message server for a list of a first plurality of group members corresponding to the subgroup identified by the first selectable attribute tag and a second plurality of group members corresponding to the subgroup identified by the second selectable attribute tag;
displaying one or more subgroup messages obtained after the filtering, wherein the one or more subgroup messages are messages sent by the first plurality of group members and the second plurality of group members included on the list, wherein each displayed subgroup message of the one or more subgroup messages which has been associated with one or more attribute tags comprises a respective attribute button to view the associated one or more attribute tags and a respective reply button displayed with the displayed subgroup message;
receiving, by the client device, a selection of a first reply button associated with a first subgroup message of the one or more subgroup messages which has been associated with the first selectable attribute tag and the second selectable attribute tag;
in response to receiving the selection of the first reply button, automatically selecting, by the client device, the first selectable attribute tag and the second selectable attribute tag and providing the user with a second display interface indicating selection of the first selectable attribute tag and the second selectable attribute tag and a message entering area for the user to enter a reply message; and
in response to the user entering the reply message and tapping a send button on the second display interface, sending the reply message to the message server for forwarding of the reply message to the first plurality of group members corresponding to the first selectable attribute tag and Han the second plurality of group members corresponding to the second selectable attribute tag.

16. The system according to claim 15, wherein the receiving the instruction for starting the group message filtering comprises:
receiving an instruction entered by the user on an operation interface of the client device and used to start the group message filtering.

17. The system according to claim 15, wherein the displaying the one or more subgroup messages obtained after the filtering comprises:
displaying, by the client device on an operation interface of the client device, a group message in the plurality of locally received group messages that satisfies the first selectable attribute tag or the second selectable attribute tag, and hiding a group message that is in the plurality of locally received group messages and that satisfies neither the first selectable attribute tag nor the second selectable attribute tag.

18. The system according to claim 15, wherein:
the first display interface includes a group message filtering operation interface; and the group message filtering operation interface comprises an operation manner and the plurality of selectable attribute tags, wherein the operation manner comprises an exclude option and an include option, wherein the include option indicates that only a group message sent by a subgroup member corresponding to the first selectable attribute tag or the second selectable attribute tag is displayed, and wherein the exclude option indicates that a group message sent by a subgroup member corresponding to the first selectable attribute tag or the second selectable attribute tag is hidden.

19. The system according to claim 15, wherein the first selectable attribute tag comprises at least one of a gender, an address, an age, a job title, or a project team.

\* \* \* \* \*

UNITED STATES PATENT AND TRADEMARK OFFICE
CERTIFICATE OF CORRECTION

| | |
|---|---|
| PATENT NO. | : 11,552,915 B2 |
| APPLICATION NO. | : 15/988002 |
| DATED | : January 10, 2023 |
| INVENTOR(S) | : Tao Liao |

Page 1 of 1

It is certified that error appears in the above-identified patent and that said Letters Patent is hereby corrected as shown below:

In the Claims

Column 10/Line 41 - In Claim 10, delete "to s" and insert -- tags --.

Column 10/Line 56 - In Claim 10, delete "replay" and insert -- reply --.

Column 11/Line 66 - In Claim 15, delete "message" and insert -- messages --.

Signed and Sealed this
Twenty-fifth Day of April, 2023

Katherine Kelly Vidal
*Director of the United States Patent and Trademark Office*